United States Patent [19]

McEachern, Jr. et al.

[11] Patent Number: 4,708,602

[45] Date of Patent: Nov. 24, 1987

[54] LUBRICATION SYSTEM FOR A TURBOCHARGER

[75] Inventors: J. Albert McEachern, Jr., Mobile; J. William Brogdon, Daphne, both of Ala.

[73] Assignee: Teledyne Industries, Inc., Los Angeles, Calif.

[21] Appl. No.: 27,079

[22] Filed: Mar. 17, 1987

Related U.S. Application Data

[63] Continuation of Ser. No. 739,385, May 30, 1985, abandoned.

[51] Int. Cl.$^4$ .................. F04B 17/00; F16C 27/00
[52] U.S. Cl. ............................ 417/407; 384/474; 384/535
[58] Field of Search ............ 417/405, 406, 407; 308/DIG. 4; 384/901, 99, 471, 473, 474, 535, 581

[56] References Cited

U.S. PATENT DOCUMENTS 3,158,413 11/1964 Shelley .
3,881,841 5/1975 Straniti .
4,213,661 7/1980 Marmol ........................ 384/99
4,364,717 12/1982 Schippers et al. ............ 417/407
4,527,911 7/1985 Davis ............................ 384/99
4,527,912 7/1985 Klusman ...................... 384/99
4,553,855 11/1985 De Choundhury ........... 384/535

FOREIGN PATENT DOCUMENTS 138922 10/1979 Japan ........................... 417/407
124032 7/1983 Japan ........................... 417/407

Primary Examiner—Louis J. Casaregola
Assistant Examiner—Timothy S. Thorpe
Attorney, Agent, or Firm—Gifford, Groh, VanOphem, Sheridan, Sprinkle and Dolgorukov

[57] ABSTRACT

A turbocharger having a main housing with a throughbore in which a tubular bearing carrier is mounted. A main shaft having a turbine at one end and a compressor at its other end extends through the bearing carrier and is rotatably mounted to the housing by two spaced bearing assemblies. A lubrication system supplies lubricant to a squeeze film damper for hydrostatically damping the shaft vibrations and the discharge of the lubricant from the squeeze film damper is employed to lubricate the bearing assemblies.

9 Claims, 3 Drawing Figures

LUBRICATION SYSTEM FOR A TURBOCHARGER

This is a continuation of co-pending application Ser. No. 739,385 filed on May 30, 1985, now abandoned.

BACKGROUND OF THE INVENTION

I. Field of the Invention

The present invention relates generally to turbochargers and, more particularly, to a turbocharger with an improved lubrication system.

II. Description of the Prior Art

There have been a number of previously known devices which hydrostatically damp a shaft rotatably mounted to a housing. Examples of such devices are shown in U.S. Pat. No. 3,881,841 to Straniti, May 6, 1975 and U.S. Pat. No. 3,158,413 to Shelley, Nov. 24, 1964.

In these previously known devices, a thin layer of lubricant, commonly known as a squeeze film damper, is entrapped between an outer race of the bearing assembly and the housing in which the shaft is rotatably mounted. This squeeze film damper hydrostatically damps shaft vibration by hydrostatic action.

There have, however, been a number of previously known disadvantages with such hydrostatically damped bearing assemblies. One such disadvantage is that, after a period of time, the lubricant which forms the squeeze film damper deteriorates. Unless new lubricant is supplied to the squeeze film damper, the dampening action of the squeeze film damper will be degraded. The same is also true when the lubricant leaks from the squeeze film damper.

SUMMARY OF THE PRESENT INVENTION

The present invention provides a turbocharger construction which overcomes all of the above mentioned disadvantages of the previously known devices.

In brief, the turbocharger of the present invention comprises a housing having a throughbore with a tubular bearing carrier positioned therethrough. The bearing carrier is dimensioned so that at least a portion of the bearing carrier is positioned radially inwardly from the housing thus forming an annular chamber therebetween.

The shaft extends through the bearing carrier and, as is conventional with turbochargers, a turbine is mounted at one end of the shaft while a compressor is mounted at the other end. A pair of axially spaced bearing assemblies rotatably mounted the shaft to the bearing carrier and thus to the housing.

Pressurized lubricant is fluidly connected to one end of the annular chamber. Similarly, a fluid passageway through the bearing carrier fluidly connects the other end of the annular chamber to one side of the bearing assembly. Thus, in operation, lubricant flows first through the annular chamber and, upon exit from the annular chamber, lubricates the bearing assemblies. Furthermore, the oil within the annular chamber forms a squeeze film damper for hydrostatically dampening the bearing assemblies and thus minimizing vibration between the housing and the shaft.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
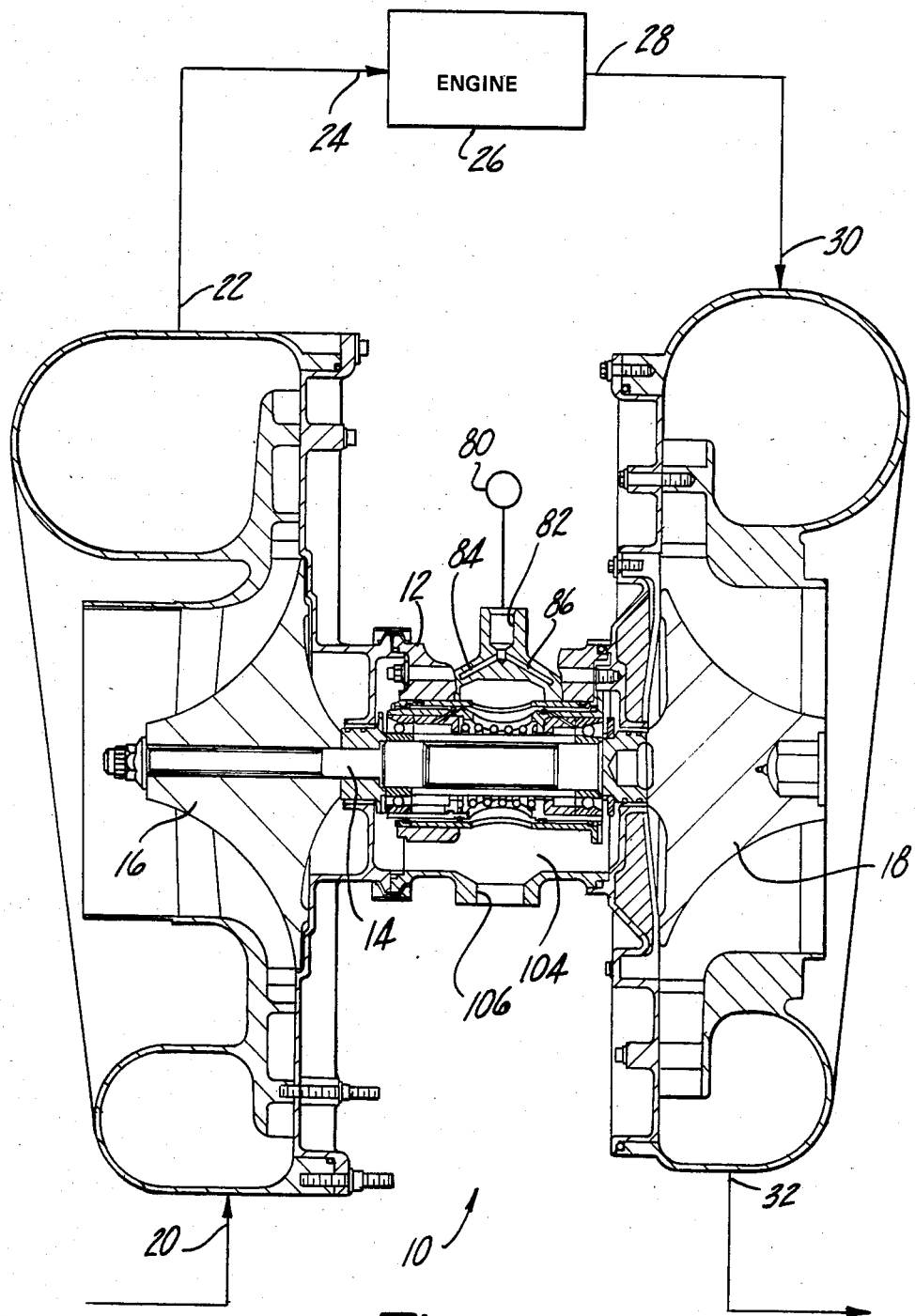
FIG. 1 is a diagrammatic view illustrating a preferred embodiment of the present invention.

With reference first to FIG. 1, a preferred embodiment of the turbocharger 10 of the present invention is thereshown and comprises a main housing 12 having a shaft 14 rotatably mounted to it in a fashion which will subsequently be described in greater detail. A compressor 16 is secured to one end of the shaft 14 which a turbine 18 is secured to the other end of the shaft 14.

Upon rotation of the compressor 16, the compressor 16 inducts air at its inlet 20 (illustrated diagramatically) and supplies compressed air at its outlet 22 to the intake 24 of the internal combustion engine 26. The internal combustion engine 26 has its exhaust 28 secured to the inlet 30 of the turbine 18 and the exhaust 32 from the turbine 18 open to the atmosphere. In the conventional fashion, the exhaust from the engine 26 rotatably drives the turbine 18 which in turn rotatably drives the compressor 16 through the shaft 14.

Figure 2:
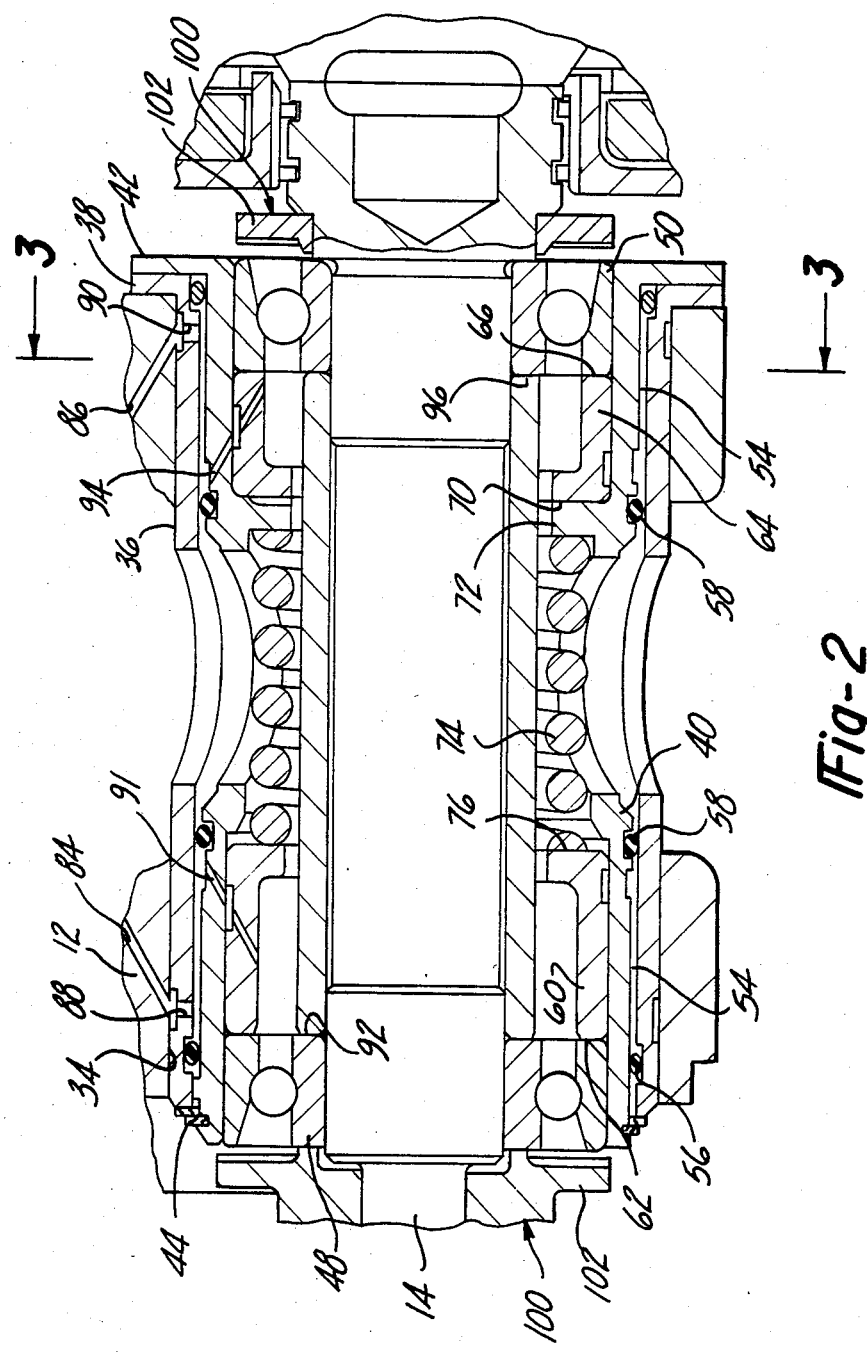
FIG. 2 is a fragmentary longitudinal sectional view illustrating the preferred embodiment of the present invention.

With reference now particularly to FIG. 2, the housing 12 includes a throughbore 34 which is coaxial with the shaft 14. A tubular bearing housing 36 having an outwardly extending flange 38 at one end is press fit into the throughbore 34 until the flanged end 38 of the bearing housing 36 abuts against the housing 12. Preferably the housing 12 is constructed of aluminum for lightweight construction while the bearing housing 36 is constructed of steel for durability.

A tubular bearing carrier 40 having an outwardly extending flange 42 at one end is then positioned coaxially within the bearing housing 36 so that the flanges 38 and 42 flatly abut against each other. A retaining ring assembly 44 secures the bearing housing 36 and bearing carrier 40 against axial movement with respect to each other.

A pair of axially spaced bearing assemblies 48 and 50 rotatably mount the turbocharger shaft 14 to the bearing carrier 40. Each bearing assembly 48 and 50 preferably comprises a ball bearing assembly having its inner race secured for rotation with the shaft 14 and its outer race secured against radial movement to the inner periphery of the bearing carrier 40. In addition the bearing assemblies 48 and 50 are mounted between the shaft 14 and bearing carrier 40 adjacent each end of the bearing carrier 40.

Figure 3:
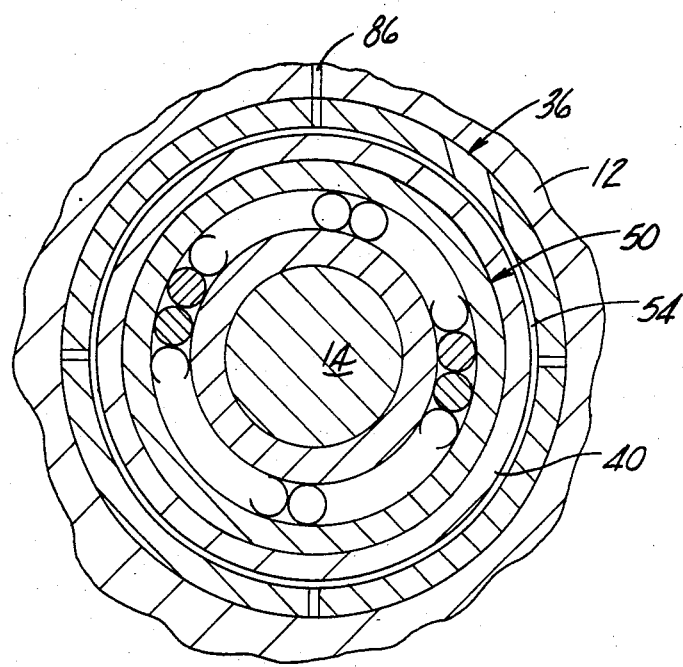
FIG. 3 is a cross sectional view taken substantially along line 3—3 in FIG. 2.

With reference now to FIGS. 2 and 3, the bearing carrier 40 is dimensioned so that each of its ends is spaced radially inwardly from the inner surface of the bearing housing 36 thus forming annular chambers 54 therebetween. Referring particularly to FIG. 2, a resilient seal 56 is sandwiched in between the tube 36 and bearing carrier 40 adjacent the outer end of each annular chamber 54 while, similarly, a resilient seal 58 is sandwiched between the tube 36 and bearing carrier 40 adjacent the inner end of each annular chamber 54. In addition, the radial width of each annular chamber 54 is very small, typically only a few thousandths of an inch.

Still referring to FIG. 2, a first annular spray nozzle 60 is contained within the interior of the bearing carrier 40 and has one axial end 62 which abuts against the outer race of the bearing assembly 48. Similarly, a second annular spray nozzle 64 is contained within the interior of the bearing carrier 40 and has its outer axial end 66 in abutment with the outer race of the other ball bearing assembly 50. The inner axial end 70 of the spray nozzle 64 abuts against a radially inwardly extending portion 72 on the bearing carrier 40.

A compression spring 74 is sandwiched in a state of compression between the inner axial end 76 of the spray nozzle 60 and the radially inwardly extending portion 72 of the bearing carrier 40. This compression spring 74 thus balances the load evenly between the outer races of the bearing assemblies 48 and 50 to minimize vibration caused by unevenly loaded bearings.

Referring now to FIG. 1, a pressurized lubricant source 80 (illustrated only diagrammatically) is fluidly connected to a fluid coupling 82 formed in the housing 12. This coupling 82, in turn, is fluidly connected to two passageways 84 and 86 formed through the housing 12.

Referring again to FIG. 2, the fluid passageway 84 is fluidly connected to a radially extending port 88 formed through the bearing housing 36 adjacent the outer end of one annular chamber 54. Similarly, the other fluid passageway 86 is fluidly connected to a radial port 90 formed through the bearing housing 36 adjacent the outer end of the other annular chamber 54.

Still referring to FIG. 2, a passageway 91 is formed through registering bores in the bearing housing 36 and bearing carrier 40. One end of the passageway 91 is open closely adjacent the innermost end of one annular chamber 54 while the other end of the passageway 91 is opened to an inner side 92 of the bearing assembly 48. Furthermore, the passageway 91 is obliquely formed with respect to the shaft axis so that it extends from the annular chamber 54 and towards the bearing assembly 48. Similarly, an oblique passageway 94 is formed through the bearing housing 36 and bearing carrier 40 so that one end of the passageway 94 is open to the other annular chamber 54 adjacent its innermost end while the other end of the passageway 94 is open to an inner side 96 of the other bearing assembly 50.

A pair of slingers 100 are secured at axially spaced positions to the shaft 12 so that one slinger 100 is positioned closely adjacent an outer end of each bearing assembly 48 and 50. Each slinger 100 includes a radially extending portion 102, preferably with impellers, which registers with and is closely adjacent its associated bearing assemblies 48 or 50. Each slinger 100, furthermore, is opened to a lubricant collection chamber 104 (FIG. 1) formed in the housing 12.

In operation, lubricant from the source 80 is supplied under pressure to the fluid coupling 82 in the housing 12 so that the lubricant flows from the source 80, through the passageways 84 and 86 and to the other ends of the annular chambers 54. The lubricant then flows axially inwardly through the annular chambers 54, through the obliquely extending passageways 91 and 94 and to the bearing assembly 48 and 50, respectively, in order to lubricate the bearing assemblies.

After passing through the bearing assemblies 48 and 50, the lubricant is expelled radially outwardly by the slingers 100 into the lubricant collection chamber 104 in the housing 12. The lubricant is then evacuated from the chamber 104 through a port 106 (FIG. 1) and recycled by the lubrication system in the conventional fashion.

Since the annular chambers 54 are very small in radial width, they form a squeeze film damper for hydrostatically mounting the bearing carrier 40, and thus the bearing assemblies 48 and 50, to the housing 12.

The primary advantage of Applicant's invention is that oil flow through the squeeze film dampers or annular chambers 54 is also used to lubricate the bearing assemblies 48 and 50. This provision of Applicant's invention thus ensures that a constant and fresh supply of oil is supplied to the squeeze film damper thereby obviating many of the previously known disadvantages of the prior art devices. Furthermore, by fluidly connecting the annular chambers 54 in series with the lubrication flow to the main bearings 48 and 50, a much simpler, inexpensive and yet totally effective construction is thereby obtained.

Having described my invention, however, many modifications thereto will become apparent to those skilled in the art to which it pertains without deviation from the spirit of the invention as defined by the scope of the appended claims.

I claim:

1. A turbocharger comprising:
a main housing having a throughbore,
a tubular bearing carrier having an outer periphery and an inner periphery, means for mounting said bearing carrier within said housing throughbore to permit limited radial movement of said bearing carrier with respect to said housing and to form at least one annular chamber between said bearing carrier and said housing,
a shaft extending through said bearing carrier, said shaft having a turbine mounted at one end and a compressor mounted at its other end,
at least one bearing assembly for rotatably connecting said shaft to the inner periphery of said bearing carrier,
a source of pressurized lubricant,
means for fluidly connecting said source to one axial end of said annular chamber,
fluid passage means formed through said bearing carrier for fluidly connecting the other axial end of said annular chamber to said bearing assembly, and
said annular chamber being dimensioned so that lubricant in said annular chamber hydrostatically damps said bearing carrier and so that said lubricant being supplied to said annular chamber acts to hydrostatically damp said bearing carrier, and then passes from said annular chamber and through said bearing carrier to said at least one bearing assembly to provide lubrication thereto.

2. The invention as defined in claim 1 and comprising a fluid seal between each end of said bearing carrier and said housing.

3. The invention as defined in claim 2 wherein each fluid seal comprises a resilient O-ring.

4. The invention as defined in claim 1 wherein said at least one bearing assembly comprises two bearing assemblies, said bearing assemblies being axially spaced from each other, and comprising fluid seals extending between said bearing carrier and said housing which separate said at least one annular chamber into two axially spaced annular chambers, said fluid connecting means extending between said source and one end of each annular chamber, said fluid passage means extending between the other end of one annular chamber and one bearing assembly and the other end of the other annular chamber and the other bearing assembly.

5. The invention as defined in claim 1 wherein said fluid passage means is open to one end of said bearing assembly and comprising a disk-shaped slinger secured to said shaft so that said slinger extends outwardly from said shaft adjacent the other side of said bearing assembly.

6. The invention as defined in claim 5 wherein said housing includes a lubrication collection chamber open to said slinger.

7. The invention as defined in claim 1 wherein said bearing assembly comprises a ball bearing assembly.

8. The invention as defined in claim 1 and comprising a bearing housing mounted through said housing throughbore, said bearing carrier being coaxially mounted within said bearing housing, and wherein said housing is constructed of aluminum and said bearing housing is constructed of steel.

9. The invention as defined in claim 8 wherein said means for fluidly connecting said source to said annular chambers includes fluid passageways extending through said bearing housing.

* * * * *